UNITED STATES PATENT OFFICE.

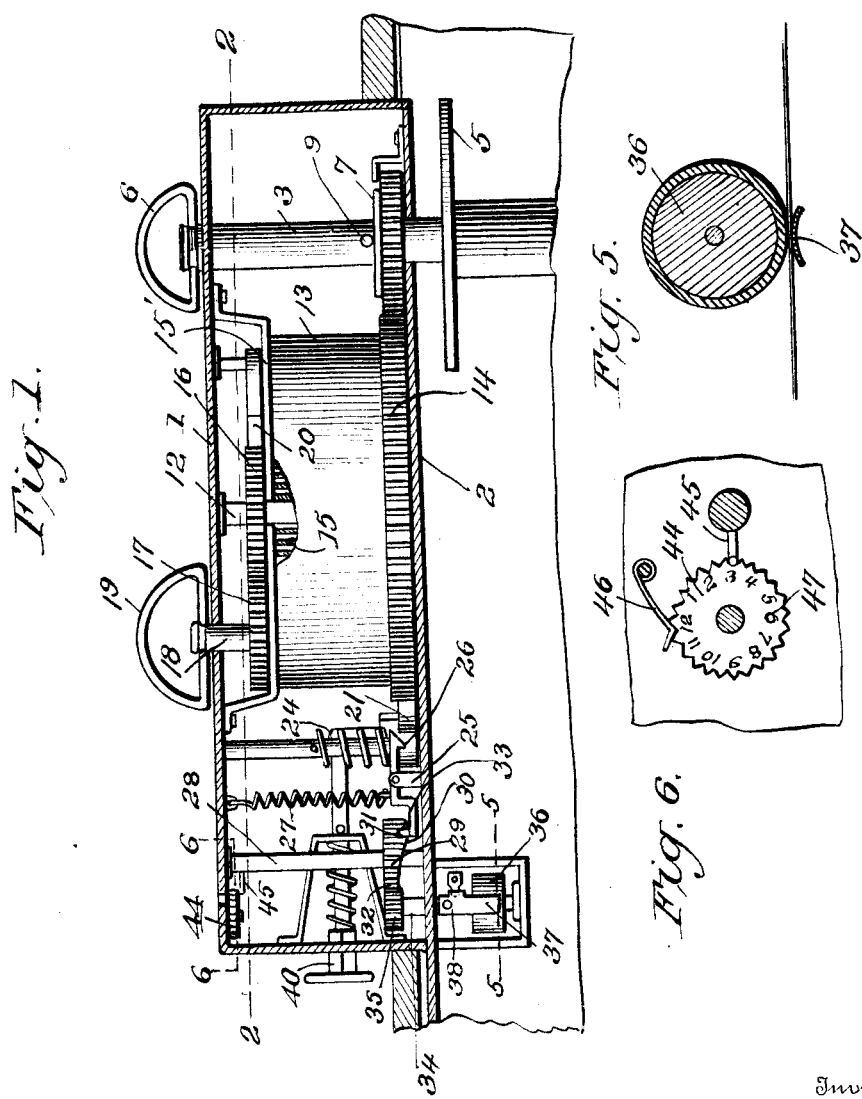

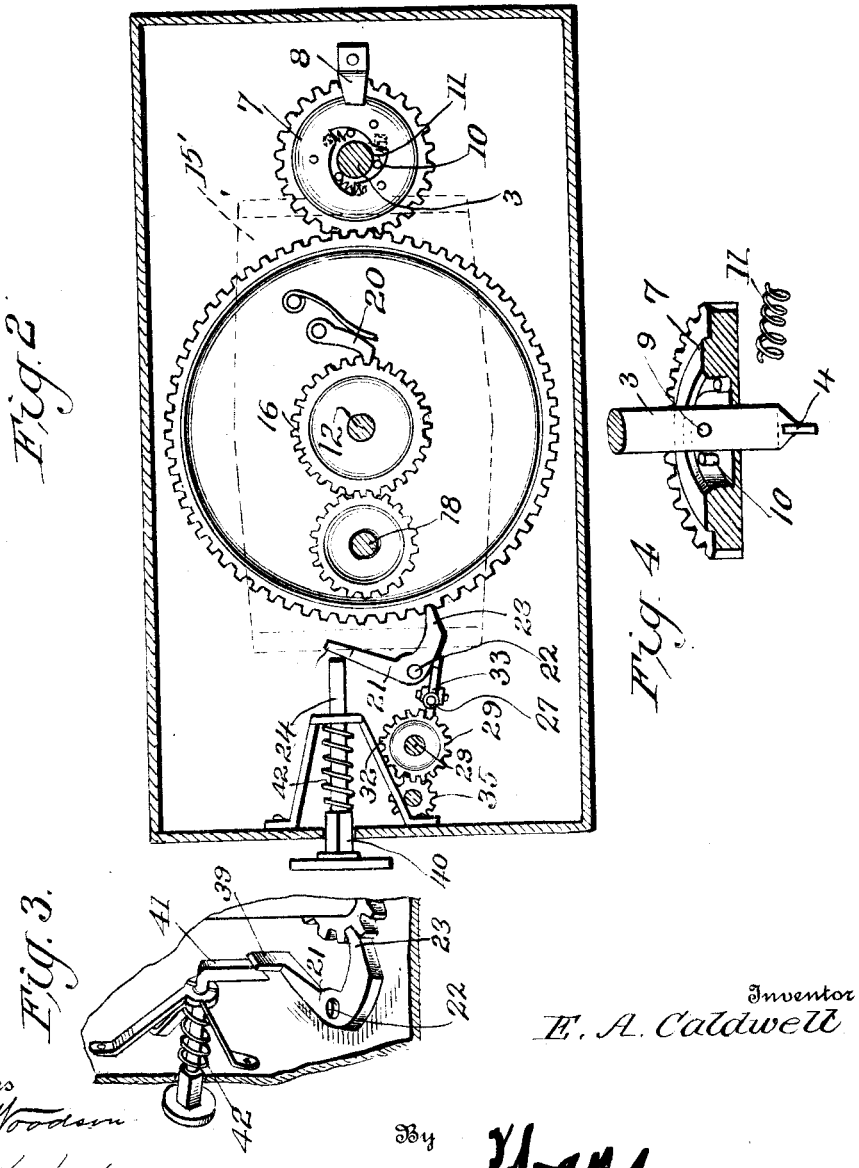

ELMER A. CALDWELL, OF STRATFORD, TEXAS.

FILM-FEEDING MECHANISM FOR CAMERAS.

1,034,870.  Specification of Letters Patent.  Patented Aug. 6, 1912.

Application filed April 21, 1911. Serial No. 622,613.

*To all whom it may concern:*

Be it known that I, ELMER A. CALDWELL, a citizen of the United States, residing at Stratford, in the county of Sherman and State of Texas, have invented certain new and useful Improvements in Film-Feeding Mechanism for Cameras, of which the following is a specification.

It is the object of the present invention to provide an improved film-feeding mechanism for cameras, the same being so constructed as to automatically feed the film for successive exposures upon pressing an actuating button or the like. Therefore, the invention aims to obviate the tedious winding of the film after each exposure and the possibility that too much of the film may be taken up when manually wound.

One novel feature of the invention resides in arranging the mechanism for control by the movement of the film so that proper positioning of successive portions of the film for exposure will be insured, and without the necessity of any attention on the part of the operator.

Another feature of the invention resides in the provision of means whereby the film may be wound upon the winding spool manually, and without in any way affecting the automatic winding mechanism.

The invention aims further to provide a novel means for indicating the number of exposures, thereby obviating the use of the usual ruby window through which the numbers on the film backing are ordinarily viewed.

For a full understanding of the invention reference is to be had to the following description and accompanying drawing, in which:—

Figure 1 is a vertical longitudinal sectional view through the mechanism embodying the present invention, parts being in elevation. Fig. 2 is a horizontal sectional view on the line 2—2 of Fig. 1. Fig. 3 is a detail perspective view of a portion of the mechanism. Fig. 4 is a similar view illustrating a clutch for the spool-winding shaft of the mechanism. Fig. 5 is a horizontal sectional view on the line 5—5 of Fig. 1. Fig. 6 is a similar view on the line 6—6 of Fig. 1.

Corresponding and like parts are referred to in the following description and indicated in all the views of the drawing by the same reference characters.

In the drawings, the mechanism embodying the present invention is illustrated as arranged within a casing built in one wall of the camera body, the casing including a top 1 and a bottom 2. Mounted in the top and bottom of the casing, near one end thereof, is a spool winding shaft 3 having its lower end projecting into the body of the camera and provided with a squared stud 4 designed to fit in the slotted end of the film spool 5. This spool 5 is the one upon which the film is to be wound after exposures are made, and it is, of course, to be understood that the arrangement of the film containing spool with relation to the winding spool 5 is the same as in any ordinary film camera. For this reason it has not been deemed necessary to illustrate the film carrying spool, nor any portion of the camera body except that occupied by the upper portion of the spool 5. The spool winding shaft 3 is provided at its upper end, which projects through the top of the casing, with a finger-key 6 by means of which it may be manually rotated to rotate the spool 5. The shaft 3 is slidably fitted through a pinion 7 which is disposed upon the bottom 2 of the casing and held against forward displacement by means of the finger 8 secured to the said bottom and projecting above the pinion. A stop-pin 9 is secured through the shaft 3 and limits the downward movement of the shaft through the pinion 7, it being understood that the shaft 3 is to be slid through the pinion 7 in order to bring its stud 4 into engagement with the slot in the end of the spool 5, at the time of disposing this spool within the camera body. The pinion 7 carries clutch-rollers 10 which are held in position by means of springs 11 and, when the pinion 7 is rotated in one direction, they bind with the shaft 3 and rotate the said shaft with the pinion. The arrangement of the clutch rollers is such however, that the shaft 3 may be rotated in the same direction, manually, independently of the pinion.

A shaft 12 is journaled in the top and bottom of the casing, and upon this shaft is mounted a barrel 13 having gear-teeth 14 at its lower end. A spring 15 is secured at one end to the inside of the wall of the barrel and at its other end to the sha 12 and serves as a means for rotating the barrel and the spool-winding shaft 3, the gear-teeth 14 being in mesh with the pin ion 7. A plate 15' is secured to the under side of the top 1 of the casing and through this plate the shaft 12 also projects. Fixed upon the shaft at a point immediately above the plate 15' is a pinion 16 which is in mesh with a pinion 17 carried by a winding shaft 18. This shaft 18 is provided with a finger-key 19 which may be grasped for the purpose of rotating the shaft and winding the spring 15. A spring-pressed pawl 20 is mounted upon the plate 15' and coöperates with the pinion 16 to prevent improper unwinding of the spring. The shaft 12 and the spring 15 are located about midway between the ends of the casing and the remainder of the mechanism embodying the invention is located in that end of the casing opposite the end in which the spool-winding shaft is arranged.

The numeral 21 indicates a pawl which is pivoted between its ends as at 22 to the bottom 2 of the casing and has one end 23 normally engaging with the gear-teeth 14 whereby to hold the barrel 13 against rotation. The pivot-post 22 for the pawl has arranged upon it a spring 24 secured at one end thereto and at its other end engaged with the pawl 21 whereby to hold the same normally in engagement with the gear-teeth of the barrel 13. Mounted pivotally in a bracket 25 upon the said bottom 2 of the casing is a detent which at one end is of hook form, as indicated by the numeral 26, and is designed at its said end to engage positively with the end 23 of the pawl to hold the same out of engagement with the teeth 14, against the tension of the spring 24. A spring 27 is connected to the detent and to the top 1 of the casing and normally holds the detent in engagement with the pawl. A shaft 28 is journaled in the top and bottom of the casing and carries a wheel 29 having a cam portion 30 and a notch 31. The periphery of the wheel 29 is toothed as indicated at 32. The end of the detent opposite its hooked end 26 is bent as at 33 to coöperate with the cam-face of the wheel 29, and its said end normally rests in engagement therewith and seats in the notch 31. A shaft 34 is journaled through the bottom 2 of the casing and at its upper end carries a small pinion 35 meshing with the toothed periphery of the cam-wheel 29. Below the casing there is fixed upon the shaft 34 a friction-wheel 36 which may be of rubber or any other suitable material and across which the film is designed to travel. A leaf-spring 37 is secured within the camera and extends beside the periphery of the wheel 36, it being so mounted, however, that it may be swung upwardly out of such position. A small spring-catch 38 normally holds the spring 37 in the first mentioned position. The upper edge of the film is to be inserted between the periphery of the friction-wheel and the said leaf-spring 37, the spring serving as a means for holding the film sufficiently firmly against the friction-wheel to insure of rotation of the latter as the film moves thereacross. The end of the pawl 21 opposite its end 23 is formed with an upstanding stud 39 and a press-button 40 has an angular stem 41 arranged to engage at its end with the said stud 39. A spring 42 is fitted upon the stem of the press-button and normally holds the said stem in the position shown in the drawings. However, when pressure is applied to the button, the pawl will be swung upon its pivot-post 22, against the tension of the spring 24, and out of engagement with the teeth of the barrel 13. This disengagement of the pawl from the barrel will allow the latter to rotate under the action of the spring 15, and this rotation of the barrel will result in like movement of the spool-winding shaft and the spool engaged thereby, the film which is connected to this spool being wound thereon by reason of such rotative movement. The movement of the end 23 of the pawl 21 out of engagement with the teeth of the barrel will result in an elevation of the end 26 of the detent and downward swinging movement of its opposite end, against the tension of the spring 27. The downward movement of the last mentioned end of the detent will cause the same to disengage with the notch 31 in the cam-face 29, and this wheel will then be free to rotate. Rotary movement is imparted to the cam-wheel through the medium of the friction-wheel 36 and its shaft, the friction-wheel being in turn rotated by the passage of the film thereacross, as before stated. Immediately upon disengagement of the end 33 of the detent from the notch in the cam-wheel, the end 26 of the said detent will automatically positively engage with the end 23 of the pawl and the pawl will thus be positively held out of engagement with the teeth of the barrel 13. As the cam-wheel completes its cycle of rotation, the cam portion 30 will ride into engagement with the end 33 of the detent and the depression of this end of the detent will result in its opposite end being swung upwardly out of engagement with the pawl 21, thus allowing the pawl to again coöperate with the barrel to hold the same against rotation. Thus, when the button 40 is depressed, the mechanism will be released for actuation and the film will be wound upon the spool 5 until properly positioned for a succeeding exposure. The movement of the film serves to actuate the means for stopping the rotation of the actuating drum 13 after a predetermined length of film has been wound upon the spool.

It has been found preferable to employ, in connection with the mechanism, above described, a device for indicating the number of exposures made upon the film, and this device includes a spur-wheel 44 mounted to rotate upon the under side of the top 1 of the casing and intermittently rotated by means of a finger 45 carried by the shaft 28 at its upper end. A spring 46 is secured to one wall of the casing and coöperates with the spur-wheel to hold the same against free movement, and upon its upper face the spur-wheel has numerals 47 indicating the number of exposures, these numerals being viewed through a small opening in the top 1 of the casing.

Having thus described the invention what is claimed as new is:—

1. In film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to engage with the pawl to hold the same so disengaged, and means actuated by the movement of the film for disengaging the detent from the pawl to release the latter when a predetermined length of film has been wound upon the spool.

2. In film-feeding mechanism for cameras, a spool-winding shaft, a pinion thereon, a spring, a gear driven by the spring and meshing with the pinion, a pivoted pawl, means normally holding the pawl in engagement with the gear, a manually-operable press-button in engagement with the pawl and operable to disengage the same from the gear, a detent arranged to engage with the pawl to hold the same so disengaged, and means actuated by the movement of the film for disengaging the detent from the pawl to release the latter when a predetermined length of film has been wound upon the spool.

3. In film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to engage with the pawl to hold the same so disengaged, and a cam means actuated by the movement of the film and coöperating with the detent to disengage the same from the pawl to release the latter when a predetermined length of film has been wound upon the spool.

4. In a film-feeding mechanism for cameras, a spool-winding shaft, a pinion thereon, a spring, a gear driven by the spring and meshing with the pinion, a pawl, means normally holding the pawl engaged with the gear, manually operable means for disengaging the pawl from the gear, a detent having a hooked end arranged to engage with the pawl to hold the same so disengaged, and cam-means coöperating with the detent and actuated by the movement of the film to disengage the detent from the pawl to release the latter when a predetermined length of film has been wound upon the spool.

5. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent pivoted between its ends and having one end formed to engage with the pawl to hold the same so disengaged, and a cam-wheel coöperating with the toothed end of the detent, and means actuated by the movement of the film to rotate the cam wheel whereby to disengage the detent from the pawl to release the latter when a predetermined length of film has been wound upon the spool.

6. In a film feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent pivoted between its ends and having one end arranged to engage with the pawl to hold the same so disengaged, a cam-wheel, a spring connected with the detent and normally holding its other end in engagement with the cam-wheel, means actuated by the movement of the film to rotate the cam-wheel whereby to disengage the detent from the pawl, thereby to release the latter when a predetermined length of film has been wound upon the spool.

7. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a pivoted detent having one end arranged to engage with the pawl to hold the latter so disengaged, a cam, means actuated by the movement of the film to move the cam, said cam coöperating with the other end of the detent and arranged when moved to rock the detent and bring its first mentioned end out of engagement with the pawl whereby to release the latter when a predetermined length of film has been wound upon the spool.

8. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to engage with the pawl to hold the latter so disengaged, a cam-wheel coöperating with the detent to disengage the same from the pawl to release the latter when a predetermined length of film has been wound upon the spool, and a film-engaged wheel having geared connection with the cam-wheel for rotating the latter.

9. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to engage with the pawl to hold the same so disengaged, a cam-wheel coöperating with the detent and arranged to disengage the same from the pawl to release the latter when a predetermined length of film has been wound upon the spool, a film-engaged friction-wheel having geared connection with the cam-wheel, and resilient means for holding the film in contact with the friction-wheel.

10. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to engage with the pawl to hold the same so disengaged, a cam-wheel coöperating with the detent and arranged to disengage the same from the pawl to release the latter when a predetermined length of film has been wound upon the spool, means actuated by the movement of the film for rotating the cam wheel, and indicating means actuated by the cam-wheel.

11. In a film-feeding mechanism for cameras, a spool-winding shaft, a pinion thereon, a spring, a gear driven by the spring and meshing with the pinion, a pawl, means normally holding the pawl in engagement with the gear, manually operable means for disengaging the pawl from the gear, a detent arranged to engage with the pawl to hold the same so disengaged, a cam-wheel formed with a notch and coöperating with the detent, for moving the latter out of engagement with the pawl to release the same when a predetermined length of film has been wound upon the spool, the detent having a portion normally fitting in the notch and thereby normally holding the cam-wheel against rotation, and means actuated by the movement of the film for rotating said cam-wheel.

12. In a film-feeding mechanism for cameras, a spool-winding shaft, a pinion thereon, a spring, a gear driven by the spring and meshing with the pinion, a pawl, means normally holding the pawl in engagement with the gear, manually-operable means for moving the pawl out of such engagement, means arranged to automatically engage with the pawl and hold the same when so moved out of engagement with the gear, when the manually-operable releasing means is actuated, and means controlled by the movement of the film for rendering the last mentioned means inoperative when a predetermined length of film has been wound upon the spool.

13. In a film-feeding mechanism for cameras, a spool-winding shaft, a pinion thereon, a spring, a gear driven by the spring and meshing with the pinion, a pawl, means normally holding the pawl in engagement with the gear, manually-operable means for disengaging the pawl from the gear, a detent arranged to automatically engage with the pawl to hold the same so disengaged upon actuation of the manually-operable means, and means coöperating with the detent and actuated by the movement of the film to release the detent from the pawl when a predetermined length of film has been wound upon the spool.

14. In film feeding mechanism for cameras, a spool winding shaft, a pinion thereon, a spring, a gear driven by the spring and meshing with the pinion, a pawl, means normally holding the pawl in engagement with the gear, manually operable means for disengaging the pawl from the gear, a detent arranged to engage with the pawl and hold the same so disengaged, and means for disengaging the detent from the pawl to release the latter when a predetermined length of film has been wound upon the spool.

15. In film feeding mechanism for cameras, a spool winding shaft, a spring motor for rotating said shaft, the said motor including a driving gear, a pawl, means normally holding the pawl in engagement with the said gear, whereby to prevent rotation thereof, manually operable means for disengaging the pawl from the gear, a detent arranged to engage with the pawl to hold the same so disengaged, and means actuated by the movement of the film for disengaging the detent from the pawl to release the latter when a predetermined length of film has been wound upon the spool.

In testimony whereof, I affix my signature in presence of two witnesses.

ELMER A. CALDWELL. [L. S.]

Witnesses:
WALTER COLTON,
P. R. SNYDER.